(12) United States Patent
Everett et al.

(10) Patent No.: US 7,921,593 B2
(45) Date of Patent: Apr. 12, 2011

(54) RODENT TRAP HAVING A SNARE

(75) Inventors: Peter J. Everett, Collinsville, CT (US); Matthew L. Phillips, Litchfield, CT (US); Lynn Briggs, Bristol, CT (US); Thomas Paul Danniger, Ostrander, OH (US)

(73) Assignee: SMG Brands, Inc., Wilmington, DE (US)

( * ) Notice: Subject to any disclaimer, the term of this patent is extended or adjusted under 35 U.S.C. 154(b) by 115 days.

(21) Appl. No.: 11/956,963

(22) Filed: Dec. 14, 2007

(65) Prior Publication Data

US 2009/0151225 A1    Jun. 18, 2009

(51) Int. Cl.
*A01M 23/34* (2006.01)

(52) U.S. Cl. .................................. 43/85; 43/87

(58) Field of Classification Search ............... 43/58, 81, 43/82, 69, 85–87; *A01M 23/34*
See application file for complete search history.

(56) References Cited

U.S. PATENT DOCUMENTS

| | | | |
|---|---|---|---|
| 83,074 A | 10/1868 | McClure | |
| 441,677 A | 12/1890 | Lovell | |
| 982,486 A | 1/1911 | Edwards | |
| 1,281,876 A | 10/1918 | Taylor | |
| 1,323,400 A | 12/1919 | Lokaj | |
| D57,320 S | 3/1921 | Dorsch | |
| 1,587,536 A | 6/1926 | Lobit | |
| 1,616,552 A * | 2/1927 | Rulison | 43/85 |
| 1,677,470 A | 7/1928 | Dorsch et al. | |
| 1,951,296 A * | 3/1934 | Kleffman | 43/85 |
| 2,529,589 A | 11/1950 | Biery | |
| 2,581,327 A * | 1/1952 | Knox | 43/82 |
| 4,030,230 A | 6/1977 | Souza | |
| 4,144,667 A | 3/1979 | Souza | |
| 4,245,423 A | 1/1981 | Souza et al. | |
| 4,253,264 A | 3/1981 | Souza | |
| 4,462,182 A | 7/1984 | French | |
| 4,769,942 A | 9/1988 | Copenhaver, Sr. | |
| 4,803,799 A | 2/1989 | Vajs et al. | |
| D300,163 S | 3/1989 | Landell et al. | |
| 4,852,294 A | 8/1989 | Langli | |

(Continued)

FOREIGN PATENT DOCUMENTS

EP    0280504    8/1988

(Continued)

OTHER PUBLICATIONS

International Search Report Dated Feb. 4, 2009 for International Application No. PCT/US08/85690.

(Continued)

*Primary Examiner* — Kimberly S Smith
*Assistant Examiner* — Marisa Conlon
(74) *Attorney, Agent, or Firm* — Hunton & Williams

(57) ABSTRACT

A trap having a housing, and a snare pivotally joined with the housing. The trap has an opening that provides a passageway for a rodent to enter the housing. The snare may pivot between a first position and a second position. In the first position, a rodent may enter the housing and position itself at least partially in the snare. A trigger is located inside the housing, so that when the trigger is triggered by a rodent, the snare pivots to its second position, snaring at least a portion of the rodent in the snare, and trapping against the housing.

21 Claims, 8 Drawing Sheets

U.S. PATENT DOCUMENTS

| | | | |
|---|---|---|---|
| 4,856,225 | A | 8/1989 | Radesky et al. |
| 4,858,373 | A | 8/1989 | Combs |
| 4,926,581 | A | 5/1990 | Grivas |
| 5,040,327 | A | 8/1991 | Stack et al. |
| 5,044,113 | A | 9/1991 | Stack et al. |
| 5,148,624 | A | 9/1992 | Schmidt |
| 5,172,512 | A | 12/1992 | Bodker et al. |
| D346,199 | S | 4/1994 | Spragins et al. |
| 5,337,512 | A | 8/1994 | Krenzler |
| 5,384,981 | A | 1/1995 | Cohen |
| 5,398,442 | A | 3/1995 | Musket |
| 5,448,852 | A | 9/1995 | Spragins et al. |
| 5,471,781 | A | 12/1995 | Vine |
| 5,477,636 | A | 12/1995 | Musket |
| 5,481,824 | A | 1/1996 | Fiore, Jr. |
| 5,572,825 | A | 11/1996 | Gehret |
| 5,577,342 | A | 11/1996 | Johnson et al. |
| D385,611 | S | 10/1997 | Prince et al. |
| D386,554 | S | 11/1997 | Brewer |
| 5,692,336 | A | 12/1997 | Fiore, Jr. et al. |
| 5,746,020 | A | 5/1998 | Fiore, Jr. et al. |
| 5,806,237 | A | 9/1998 | Nelson et al. |
| D409,711 | S | 5/1999 | Johnson |
| 5,950,353 | A | 9/1999 | Johnson et al. |
| 6,047,494 | A | 4/2000 | Johnson et al. |
| D441,828 | S | 5/2001 | Leyerle et al. |
| 6,248,730 | B1 | 6/2001 | Poché |
| 6,266,917 | B1 | 7/2001 | Hight |
| 6,389,738 | B1 | 5/2002 | Denny et al. |
| D459,428 | S | 6/2002 | Johnson et al. |
| 6,397,517 | B1 | 6/2002 | Leyerle et al. |
| 6,415,544 | B1 | 7/2002 | Leyerle et al. |
| 6,481,151 | B1 | 11/2002 | Johnson et al. |
| 6,493,988 | B1 | 12/2002 | Johnson |
| 6,508,031 | B1 | 1/2003 | Johnson et al. |
| 6,574,912 | B1 | 6/2003 | Johnson |
| 6,594,948 | B1 | 7/2003 | Novack |
| 6,609,328 | B2 | 8/2003 | Swift et al. |
| 6,622,422 | B2 | 9/2003 | Gehret et al. |
| 6,631,582 | B2 | 10/2003 | Knuppel et al. |
| D485,597 | S | 1/2004 | Turner |
| 6,684,560 | B2 | 2/2004 | Lafforthun |
| 6,691,452 | B1 | 2/2004 | Knuppel et al. |
| 6,694,669 | B2 | 2/2004 | Gehret et al. |
| 6,735,899 | B1 | 5/2004 | Anderson et al. |
| 6,775,947 | B2 | 8/2004 | Anderson et al. |
| 6,796,081 | B2 | 9/2004 | Anderson et al. |
| 6,807,768 | B2 | 10/2004 | Johnson et al. |
| 6,836,999 | B2 | 1/2005 | Rich et al. |
| 6,938,368 | B2 | 9/2005 | Guidry |
| 6,955,007 | B2 | 10/2005 | Gehret et al. |
| 6,990,766 | B2 | 1/2006 | Gehret et al. |
| D514,655 | S | 2/2006 | Rodgers et al. |
| D515,175 | S | 2/2006 | Mayo et al. |
| 7,010,882 | B2 | 3/2006 | Rich et al. |
| 7,069,688 | B2 | 7/2006 | Hill |
| 7,089,701 | B2 | 8/2006 | Frisch |
| D529,571 | S | 10/2006 | Hoyes |
| 7,171,777 | B2 | 2/2007 | Welin-Berger |
| 7,219,466 | B2 | 5/2007 | Rich et al. |
| 7,231,738 | B2 | 6/2007 | Watson et al. |
| 2003/0215481 | A1 | 11/2003 | Borchert et al. |
| 2004/0025410 | A1 | 2/2004 | Shapland |
| 2004/0088903 | A1 | 5/2004 | Poche |
| 2004/0244274 | A1 | 12/2004 | Dellevigne et al. |
| 2005/0279015 | A1 | 12/2005 | Hall |
| 2006/0032110 | A1 | 2/2006 | Yang |
| 2006/0042153 | A1 | 3/2006 | Bowerman |
| 2006/0053682 | A1 | 3/2006 | Goldstein |
| 2006/0117644 | A1 | 6/2006 | Hoyes et al. |
| 2006/0156615 | A1 | 7/2006 | Hale |
| 2006/0156617 | A1 | 7/2006 | Hale |
| 2006/0265941 | A1 | 11/2006 | Newton |
| 2006/0272197 | A1 | 12/2006 | Wiesener et al. |
| 2007/0017148 | A1 | 1/2007 | Blau |
| 2007/0017149 | A1 | 1/2007 | Rodgers et al. |

FOREIGN PATENT DOCUMENTS

| | | |
|---|---|---|
| EP | 0553336 | 8/1993 |
| EP | 0745323 | 12/1996 |
| EP | 0806138 | 11/1997 |
| EP | 1149530 | 10/2001 |
| GB | 2329125 | 3/1999 |
| GB | 2384966 | 8/2003 |
| JP | 6165630 | 6/1994 |
| WO | WO 02/102147 | 12/2002 |
| WO | WO 03/059057 | 7/2003 |
| WO | WO 2005/022992 | 3/2005 |
| WO | WO 2005/072524 | 8/2005 |

OTHER PUBLICATIONS

International Preliminary Report on Patentability Dated Jun. 24, 2010 for PCT/US2008/085690.

* cited by examiner

RODENT TRAP HAVING A SNARE

BACKGROUND

1. Field of the Art

The present exemplary embodiments relate to an animal trapping device in general, and more particularly to a rodent trap having a housing member, and a snare that, when the trap is triggered, entraps the rodent, snares the rodent, or both.

2. Description of Related Art

Conventional rodent traps are not always self contained. In other words, in conventional rodent traps the trapping mechanism, and therefore the trapped rodent, are open to the environment so that they are visible to and accessible from the environment. For example, in conventional rodent traps, such as those having a spring loaded wicket trap or "glue trap," the "trapped" mouse is visible and in some cases still alive, thus making disposal of the trap difficult and uncomfortable for some users. In addition, because these type of traps are not self-contained children and/or pets can accidentally trigger the traps and/or get caught in the trap. For example, a pet dog may attempt to eat the bait on the spring loaded wicket trap and have the wicket come down on the dog's snout. With respect to glue traps, a child may step on the trap and have a difficult time removing the trap and/or glue. These and other problems are known to exist with conventional traps.

The description herein of certain advantages and disadvantages of known methods and devices is not intended to limit the scope of the present invention. Indeed, the present embodiments may include some or all of the features described above without suffering from the same disadvantages.

SUMMARY

In accordance with one embodiment, a rodent trap is provided having a housing with at least one opening, and a snare pivotally coupled with the housing and extending at least partially into the housing. The trap has a trigger that, when triggered by a rodent, causes the snare to pivot upward, trapping the rodent.

In another embodiment, a rodent trap is provided having a housing, a snapper plate assembly, and a trigger. The housing has a base and at least one opening providing a passageway into the housing. The snapper plate assembly has a plate pivotally coupled with the housing, and a snare operatively coupled with the plate, and extending at least partially into the housing. The trigger is disposed at least partially inside the housing. When the trigger is triggered by a rodent, the trigger causes the snapper plate assembly to pivot, thereby snaring the rodent in the snare and substantially obstructing the at least one opening.

BRIEF DESCRIPTION OF THE DRAWINGS

Purposes and advantages of the exemplary embodiments will be apparent to those of ordinary skill in the art from the following detailed description in conjunction with the appended drawings in which like reference characters are used to indicate like elements, and in which.

These and other exemplary embodiments and advantages will become apparent from the following detailed description, taken in conjunction with the accompanying drawings, illustrating by way of example the principles of the various exemplary embodiments.

DETAILED DESCRIPTION OF PREFERRED EXEMPLARY EMBODIMENTS

The following description is intended to convey a thorough understanding of the embodiments by providing a number of specific embodiments and details involving a rodent trap. It is understood, however, that the invention is not limited to these specific embodiments and details, which are exemplary only. It is further understood that one possessing ordinary skill in the art, in light of known devices, systems and methods, would appreciate the use of the invention for its intended purposes and benefits in any number of alternative embodiments.

Generally speaking, the rodent traps of the various exemplary embodiments described herein include a housing with a snare partially inside the housing. A rodent may enter the trap through an opening. Inside the trap, a bait or attractant may draw the rodent toward a trigger. When the rodent approaches the trigger, a portion of its body passes through the snare. Thereafter, when the rodent manipulates the trigger, the snare is quickly drawn about the rodent's body, snaring and trapping the rodent.

The various exemplary embodiments generally described devices that "trap" an animal. In the various embodiments, the animal may simply be trapped inside the device so that it cannot escape from the device. However, the embodiments are not so limited. In various embodiments, the trapped animal may be immobilized, injured or killed. For example, in various exemplary embodiments, the trapped animal may be immobilized inside the device by the device itself or by one or more immobilizing elements inside the device. Where the trapped animal is a mouse, immobilizing the mouse can cause the mouse to develop hypothermia which can eventually kill the mouse. In other embodiments, the device may injure the trapped animal, such as by crushing it, or impaling it. In other embodiments, the trapped animal may suffer a fatal injury, such as a broken neck.

The various exemplary embodiments are generally described throughout this description as a device adapted to trap an animal such as a rodent. However, the embodiments are not so limited. It is understood that the various embodiments of the invention may be appropriate for trapping a number of different insects or animals.

Figure 1:
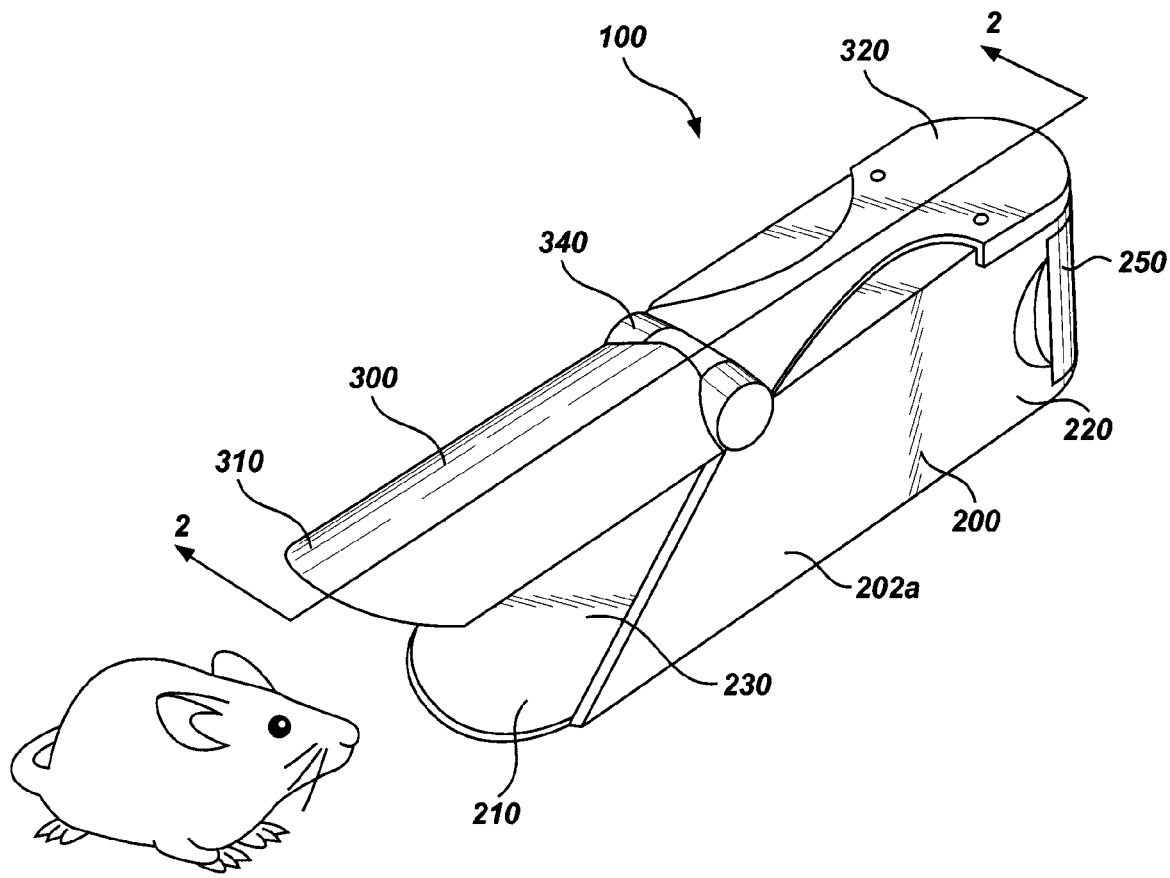
FIG. 1 depicts a perspective view of a rodent trap in accordance with an exemplary embodiment.
Figure 2:
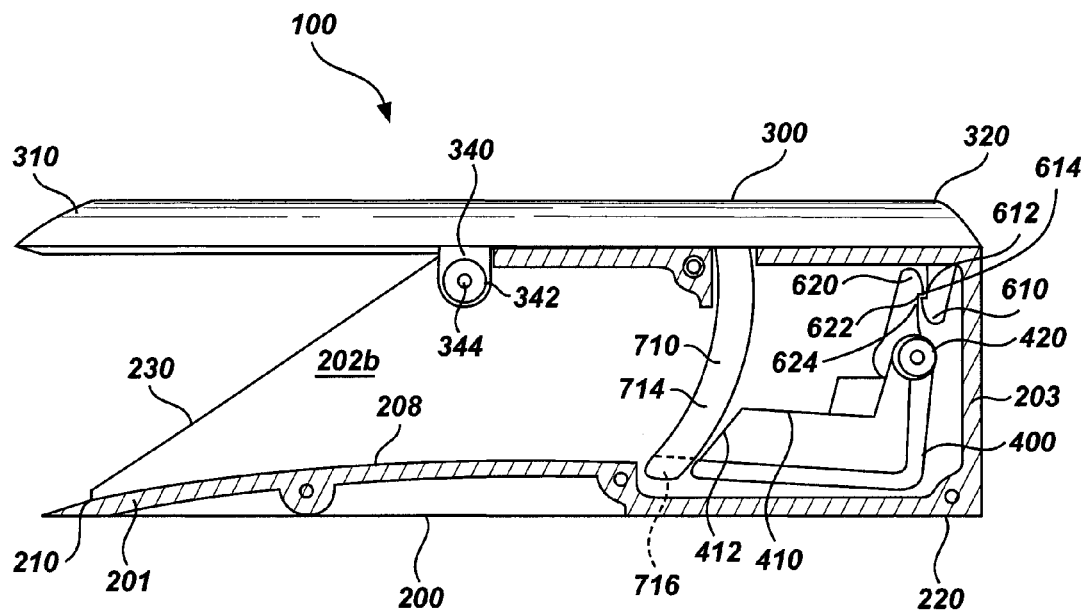
FIG. 2 depicts an elevation view of a rodent trap, as viewed along 2-2 in FIG. 1, in accordance with an exemplary embodiment.
Figure 3:
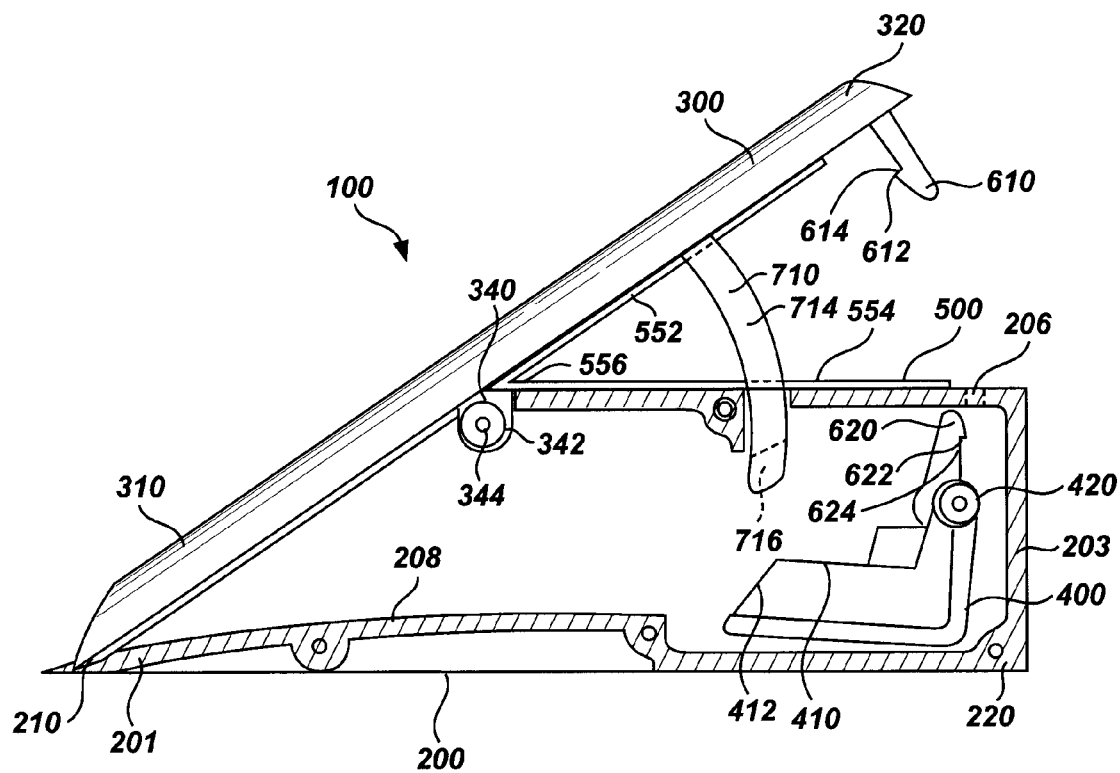
FIG. 3 depicts an elevation view of a rodent trap, as viewed along 2-2 in FIG. 1, in accordance with an exemplary embodiment.

An exemplary embodiment of a rodent trap 100 is illustrated in FIGS. 1, 2, and 3. It should be appreciated that all of the drawing figures illustrate a simplified view of an exemplary trap 100, and its components, and that trap 100 may include additional elements that are not depicted. FIG. 1 shows a perspective view of the trap 100, in an open position. FIGS. 2 and 3 show a side elevation view of the trap 100, with one side wall (202a) removed to show the internal parts of the trap 100. In the exemplary embodiment illustrated in FIG. 1, trap 100 may have a housing 200. Housing 200 may have a front portion 210 and a rear portion 220. The front portion 210 of the housing 200 may have an opening 230 that provides a passageway, such as for a rodent to enter the housing 200. In a preferred exemplary embodiment, housing 200 may provide a partial enclosure large enough to enclose a rodent. For example, as illustrated in FIGS. 1-3 housing 200 may have a base wall 201, first and second side walls 202a, 202b, a rear wall 203, and an upper wall 204.

In exemplary embodiments, trap 100 may include a snapper plate 300, pivotally coupled with the housing 200. The snapper plate may have a front portion 310 generally corresponding the front portion 210 of the housing 200, and a rear portion 320 generally corresponding the rear portion 220 of the housing 200. In some embodiments, the front portion 310 of the snapper plate may be adapted to open and close about the opening 230 in the housing 200, to open or close the passageway into the housing. In other embodiments, the rear portion 320 of the snapper plate may be adapted to cooperate with the rear portion 220 of the housing 200 to provide a trapping means, such as a snare 700, to immobilize a rodent therein. In other embodiments, both the front portion 310 and the rear portion 320 cooperate to provide two separate means for confining and trapping a rodent inside the trap 100. For example, the front portion 310 of snapper plate 300 may close the opening 230 of the housing 200, confining a rodent inside the housing 200 while the rear portion 320 of the snapper plate 300 snares the confined rodent. Various means for configuring and operating the trap are described in more detail below.

Figure 4:
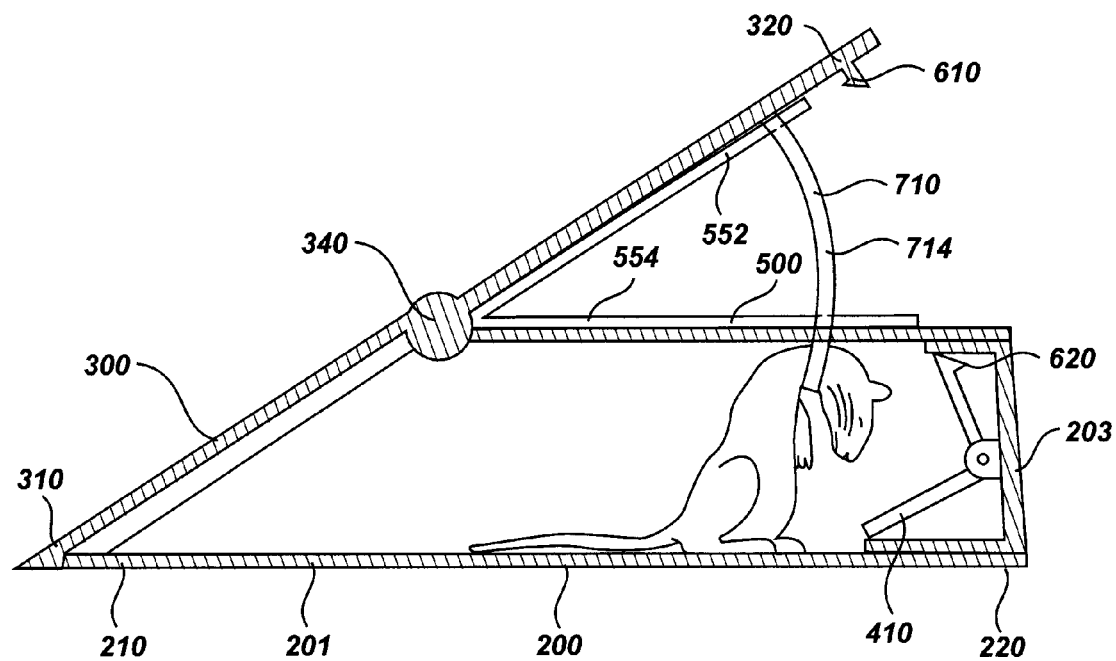
FIG. 4 depicts an elevation view of a rodent trap, in accordance with an exemplary embodiment.

In the exemplary embodiment illustrated in FIGS. 1-3, the snapper plate 300 may be pivotally coupled to the housing 200, such as at pivoting member 340. The pivoting member 340 may be located at an intermediate portion 330 of the snapper plate 300. The pivoting member 340 may enable the front portion 310 of the snapper plate 300 to pivot between an open and closed ("snapped") position over opening 230. In an exemplary embodiment, the front portion 310 and the rear portion 320 of the snapper plate 300 are substantially rigidly connected so that pivotal movement of the front portion 310 of the snapper plate 300 between the open and snapped positions is simultaneous with that of the rear portion 320 of the snapper plate 300. For example, when the snapper plate 300 is in its open position, the rear portion 320 of the snapper plate 300 is in a set or unsnared configuration, as shown in FIGS. 1 and 2. When the snapper plate 300 is in a snapped position, such as shown in FIGS. 3 and 4, the rear portion 320 of the snapper plate 300 is in a snared or trapped position. While various exemplary embodiments described herein are described with reference to a snapper plate 300 having a substantially rigid connection between the front and rear portions 310, 320 of the snapper plate 300, it will be understood that the front and rear portions 310, 320 of the snapper plate 300 may be otherwise connected, such as with a pivotal connection or a slidable connection, while providing the same or similar function described above.

It will be appreciated that any suitable device may be used for pivoting member 340, so long as it can provide a direct or indirect pivotal joint between the snapper plate 300 and a housing 200. For example, FIG. 2 illustrates an exemplary embodiment in which snapper plate 300 may have at least one bearing member 342 extending from the underside of the snapper plate 300. The bearing member 342 may have an aperture or other similar structure suitable for receiving a shaft or boss. A corresponding boss or stub shaft 344 may be disposed on or joined with one or both side walls 202a, 202b of the housing 200. The boss or stub shaft 344 may be seated in corresponding bearing member 342, providing a pivotal relationship between the housing 200 and the snapper plate 300. In alternative exemplary embodiments, pivoting member 340 may include bearing members 342 on both the housing 200 and the snapper plate 300, and an axle or shaft extending through the bearing members 342 on both the housing 200 and the snapper plate 300. It will be appreciated that other suitable devices may be provided as pivoting member 340, and may be incorporated into the trap 100 to provide the same or similar function described herein.

In the exemplary embodiment of FIGS. 1-3, the snapper plate 300 may be pivotally coupled to the upper surface of the housing 200. In the illustrated embodiments, the front and rear portions 310, 320 of the snapper plate 300 may pivot up and down about pivoting member 342. For example, in the open or set position, the front portion 310 of the snapper plate 300 pivots upward so that it does not substantially block or impede opening 230 to the trap 100, as illustrated in FIGS. 1 and 2. Therefore, in this set position, a rodent may enter and exit the opening 230 of the housing 200. When the snapper plate 300 is in the closed or snapped position, the front portion 310 of the snapper plate 300 pivots down over the opening 230 in housing 200, and substantially blocks the passageway to the housing 200, preventing a rodent from entering or exiting the housing 200, as illustrated in FIG. 3. While the exemplary embodiment is described in reference to a snapper plate 300 being joined to the upper wall 203 of the housing 200, it is appreciated that the snapper plate 300 may be mounted on other portions of the housing 200 (e.g., the side wall 202a or 202b or the base wall 201), without significantly departing from the spirit and scope of the exemplary embodiments.

Figure 5:
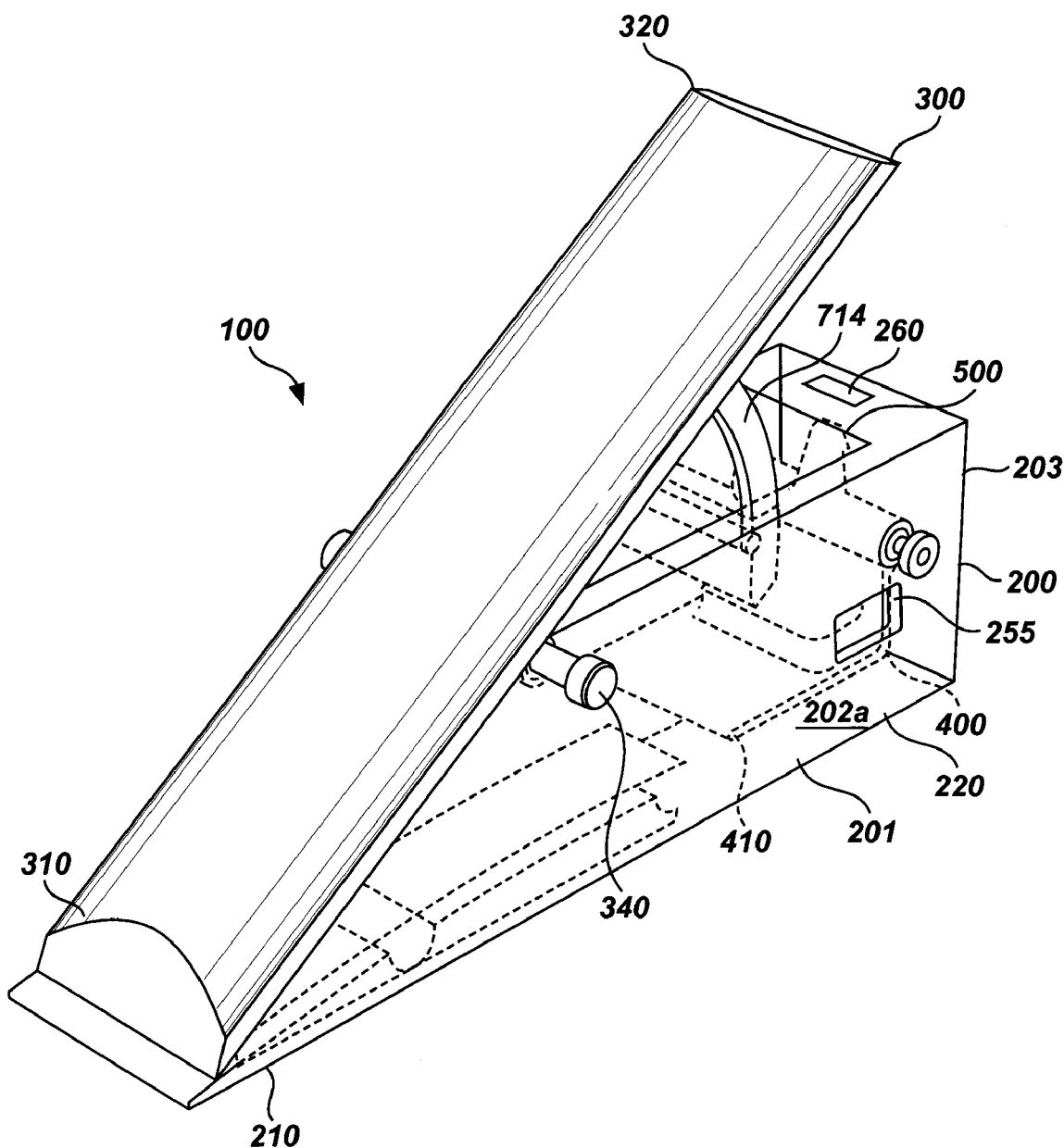
FIG. 5 depicts a perspective view of a rodent trap, in accordance with an exemplary embodiment.
Figure 8:
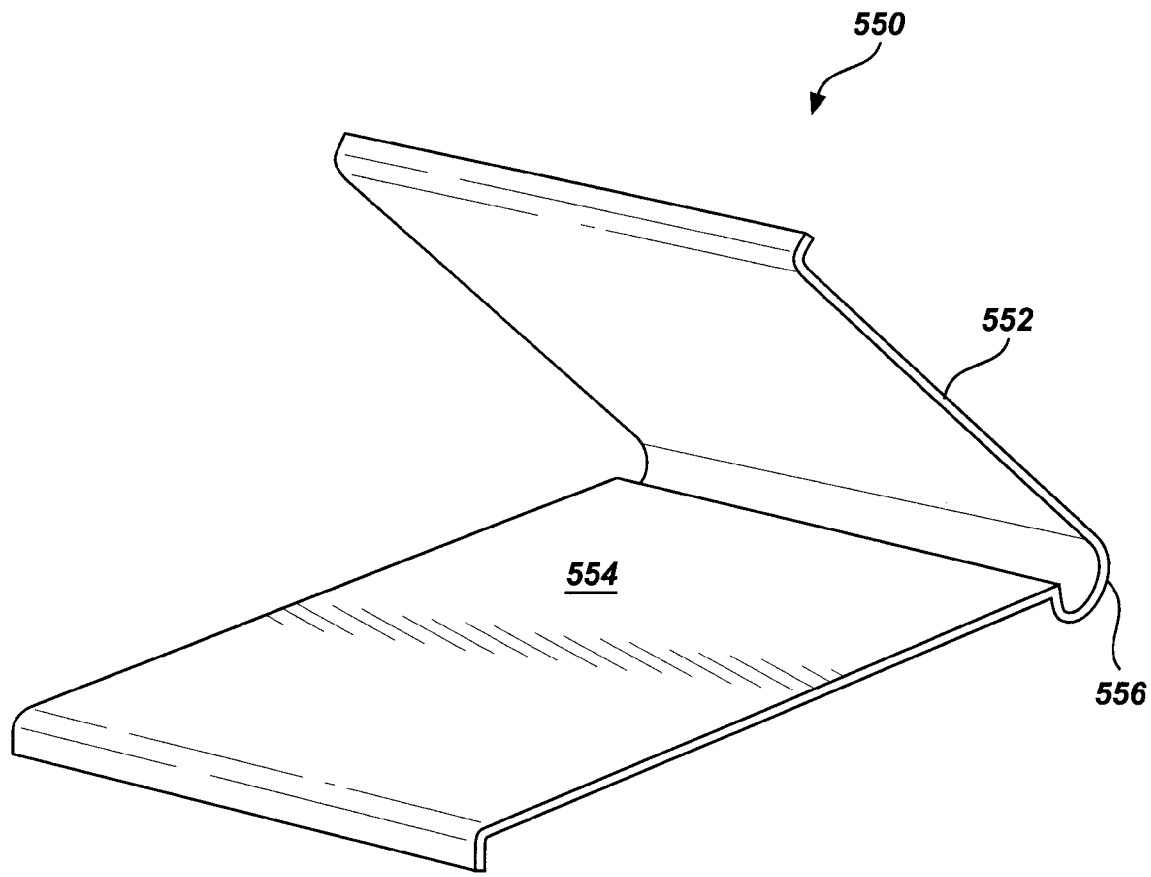
FIG. 8 depicts a perspective view of a spring clip, in accordance with an exemplary embodiment.

In various exemplary embodiments, the snapper plate 300 and housing 200 may be biased toward the snapped (closed, snared) position, as shown in FIGS. 3-5. The trap 100 may include a biasing mechanism 500 to provide a biasing force between the housing 200 or snapper plate 300 or both to urge the members toward the snapped configuration. For example, a spring clip (v-clip) 550 may be provided between the snapper plate and the housing upper wall 204, as illustrated in FIGS. 3-5. An exemplary spring clip 550 is illustrated in FIG. 8. In this exemplary embodiment, spring clip 550 may have a first side 552, and a second side 554, joined at connector 556. The spring clip 550 may be made of any flexible material that has a memory, such as, for example, spring steel. In an exemplary embodiment, as illustrated in FIG. 3, the connector 556 may be disposed at or near the pivot means 342, with first side 552 operably coupled with the snapper plate 300, and the second side 554 operably coupled with the housing member 200. In this configuration, the first and second sides 552, 554 of the spring clip 550 exert a biasing force against the snapper plate 300, and the housing member 200.

It is understood that other biasing mechanisms 500 may be provided in the alternative to, or in addition to spring clip 550. For example, in various exemplary embodiments, the biasing mechanism 500 may comprise a torsion spring (coil spring, helical spring), with at least one arm providing force against the snapper plate 300, and at least one arm providing force against the housing member 200, urging them toward the closed or snapped position. In other exemplary embodiments, the biasing force may be provided by a tension spring, a cantilever spring, a compression spring, an elastomeric material, or any other device or material suitable for providing a biasing force sufficient to urge the members 200, 300, to their closed or snapped position.

To set the trap 100 in the open position, a force may be applied to the housing 200 and/or snapper plate 300 that overcomes the biasing force, and moves the housing 200 and/or the snapper plate 300 to the open or set position. For example, a user of the trap may apply a manual force to the rear portion 320 of the snapper plate 300, such as by pressing on it or stepping on it, to force it into the open or set position. In various exemplary embodiments, other means may be provided to move the snapper plate 300 or housing 200, or assist in the movement of the snapper plate 300 or housing 200 to the open or set position.

To hold the snapper plate 300 and housing 200 in the open or set position, a latching mechanism 600 may be provided. For example, as shown in FIGS. 2 and 3, snapper plate 300 may have a latch flange 610 that extends downwardly from the rear portion 320 of the snapper plate 300, through the opening 206 and into the housing 210. The distal end of latch flange 610 may have a notch 612. A corresponding upwardly projecting latch flange 620, as shown in FIG. 3, may be provided inside the housing 200. The latch flange 620 may be joined with the housing 200, such as on a pivot 340, in the rear portion 220 of housing 200. The distal end of latch flange 620 may have a notch 622 that is configured to engage with notch 612 of the latch flange 610, when the snapper plate 300 and housing 200 are in a latched position. In exemplary embodiments, the notches 612, 622 have mating surfaces 614, 624 that engage when the latching flanges 610, 620 are latched. These mating surfaces 614, 624 preferably have a sufficient size and angle to hold the two latch flanges 610, 620 in the latched position. For example, it is believed that in certain embodiments it is preferable to have mating surfaces 614, 624 that are about 0.5 millimeters to about 1.0 millimeters long, to have sufficient latching force to keep the latching flanges 610, 620 latched. In addition, it is believed that in certain embodiments it is preferable that the plane in which the mating surfaces 614, 624 lie is tangential to the pivot axis of the latch flange 622. When the two latches 610, 620 are engaged in a latched position, the snapping plate 300 and housing 200 are maintained in their open or set position. It is understood that other suitable latching mechanisms 600 may be provided in addition to or in the alternative to those described above for the same purposes described herein.

To release the trap 100 from the open position, a triggering mechanism 400 may be provided that releases latching mechanism 600, enabling the biasing mechanism 500 to force the snapper plate 300 and the housing 200 to the snapped position. In an exemplary embodiment, the triggering mechanism 400 may be configured to be triggered by a rodent inside the housing. For example, as shown in FIGS. 2 and 3, triggering mechanism 400 may be disposed inside the rear portion 220 of the housing 200. In exemplary embodiments, a rodent could enter housing 200 at opening 230, and travel toward the rear of the housing 220, such as by traversing on entry platform 208. The entry platform 208 may be located adjacent the base wall 210, and may extend from about the opening 230, to about the location where snare 710, and triggering mechanism 400 are provided. The entry platform 208 stops short of the triggering mechanism so that after traversing the length of the entry platform 208, the rodent may only proceed further toward the rear wall 203 of the housing 200 by stepping onto the triggering mechanism 400.

In an exemplary embodiment, the latching mechanism 600 may include a biasing means to bias the latching mechanism 600 toward the latched position. For example, in embodiments in which latching flange 620 is pivotally connected with the housing 200, a spring coil may be operatively coupled with the latch flange 620, to provide a biasing force to keep the latching flange 620 in the latched position. The biasing force provided by said biasing means should be sufficient to maintain the latching mechanism 600 in its latched position, and the triggering mechanism 400 should be able to provide sufficient force to overcome this biasing force, to move the latch flange 620 to its released position. It will be appreciated that various devices may be provided that are sufficient to provide such a biasing force to the latching mechanism 400.

In exemplary embodiments, an attractant 430 may be provided to draw a rodent toward the rear wall 203 of the housing 200. Suitable attractants 430 may include a bait, such as a food or chemical bait, a fragrance, a rodenticide, or other suitable means for attracting the rodent toward the rear portion 220 of the housing 200. It will be appreciated that there are various suitable attractants 430 that may be incorporated into the trap 100, to provide the same or similar function described herein. In exemplary embodiments, the attractant 430 should entice a rodent toward the rear portion 220 of the housing 200, so that the rodent will be likely to actuate the triggering mechanism 400.

Figure 7:
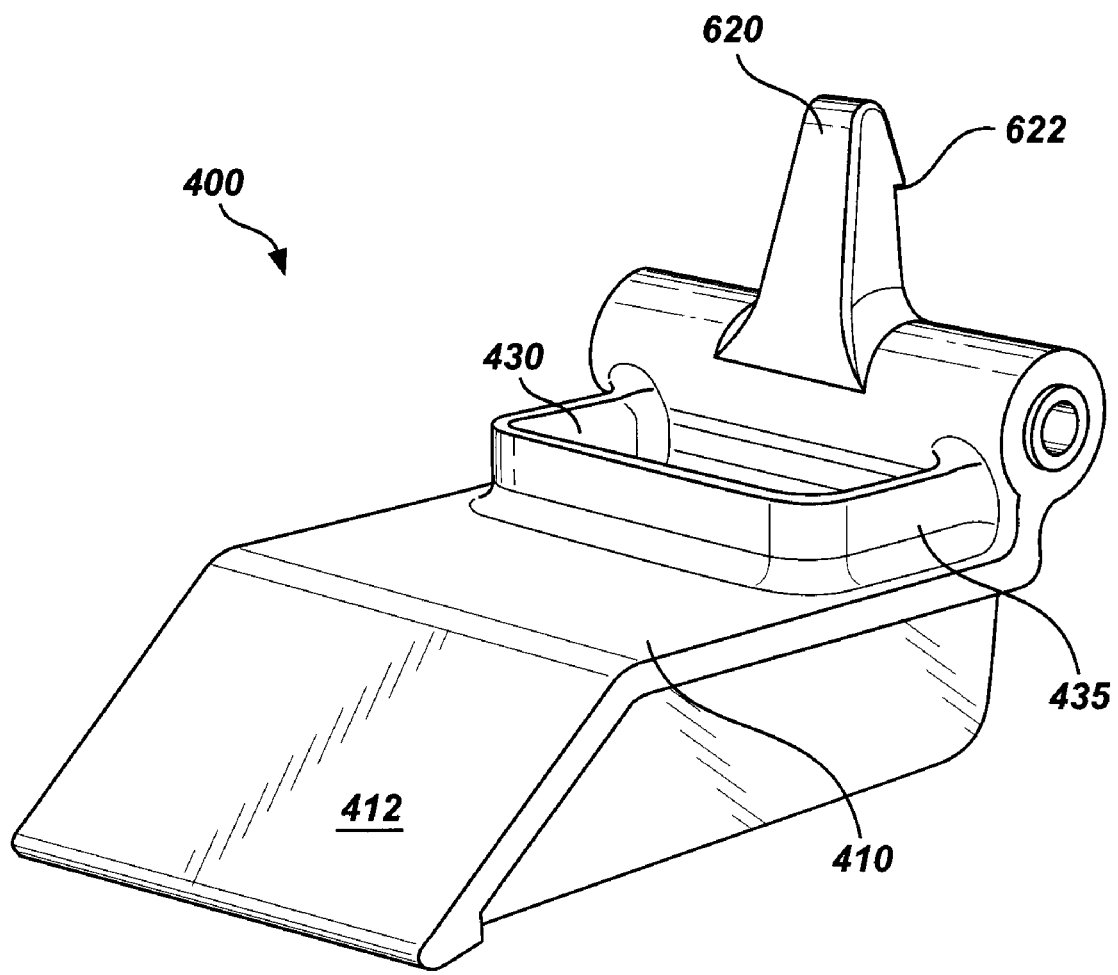
FIG. 7 depicts a perspective view of a triggering mechanism, in accordance with an exemplary embodiment.

In an exemplary embodiment, triggering mechanism 400 may have a triggering plate 410 that is located adjacent the base 201 of the housing 200. The triggering plate 410 may be configured so that when a rodent steps on the plate 410, the plate 410 is depressed, actuating the triggering mechanism 400. In exemplary embodiments, the triggering plate 410 is located above the entry platform 208, so that a rodent should climb up to the triggering plate 410. As illustrated in FIG. 7, in the exemplary embodiments the triggering plate 410 may have a leading edge 412 that provides an inclined surface leading from the entry platform 208 to the triggering plate 410.

In various exemplary embodiments in which an attractant 430 is provided, an attractant receptacle 435 may be provided on the triggering mechanism 400, to receive the attractant 430. For example, in the exemplary embodiment illustrated in FIG. 7, the attractant receptacle 435 may be provided on the rearward portion of the triggering plate 410. In this exemplary configuration, the rodent should step at least partially onto the triggering plate 410 to get close to the attractant 430. It will be understood that there are other locations within the housing that the attractant 430 and/or the attractant receptacle 435 may be disposed, to ensure that the rodent will likely step onto the triggering plate 410, or otherwise actuate the triggering mechanism 400.

In various exemplary embodiments, the trap 100 may be provided to the user with an attractant 430 already installed. For example, when a user obtains the trap 100, an attractant 430 may be disposed in the housing 200. In certain exemplary embodiments, the trap 100 may be provided with an attractant 430, but the user should expose the attractant 430 prior to use. For example, the attractant 430 may be provided in the housing 200 with a plastic or foil wrapper that should be removed by the user prior to use, or the attractant 430 may be provided in a blister pack to which the user applies pressure in order to expose the attractant 430. In certain exemplary embodiments, the user may expose the attractant 430 from outside of the housing 200. In other exemplary embodiments, the trap 100 may be provided with one or more means for inserting the attractant 430 into the housing 200, or replacing old or spent attractant 430. For example, in the exemplary embodiment illustrated in FIG. 1, an openable tray 250 may be provided, into which a user may deposit the attractant 430, and then close. In other exemplary embodiments, such as one illustrated in FIG. 5, one or more cutaways 255 may be provided to insert an attractant 430, or remove and replace an attractant 430. Where such a cutaway is provided, it is preferred that the cutaway 255 is small enough so as not to provide an entrance or exit point for a rodent. It is appreciated that alternative means for inserting attractant 430, removing attractant 430, or both may be provided in trap 100, such as, for example a groove or opening for receiving a pre-baited device.

In various exemplary embodiments, the triggering mechanism 400, once actuated, may directly or indirectly release the latching mechanism 600 from the latched position. For example, in exemplary embodiment shown in FIGS. 2 and 3, the triggering plate 410 may be pivotally connected to the housing 200 at trigger pivot means 420. Latch flange 620 may also be pivotally connected to the trigger pivot means 420, and rigidly connected to the triggering mechanism 400, as illustrated in FIG. 7. In this exemplary configuration, when triggering plate 410 is depressed, the triggering mechanism 400 pivots about pivot means 420, causing the latch flange 620 to simultaneously pivot about pivot means 420. When latch flange 620 has moved a sufficient distance, it releases from corresponding latch flange 610, which releases the snapper plate 300.

It is understood that other suitable triggering mechanisms 400 may be used in the trap 100 of the exemplary embodiments suitable triggering mechanism 400 should be configured to be actuated by a rodent. For example, a suitable triggering mechanism 400 may actuated by a rodent pushing or nuzzling against a trigger. Alternatively, a triggering mechanism 400 may be provided that is triggered by other means such as an electronic sensing device.

As mentioned above, when the latching mechanism 600 is released from its latched position, the snapping plate 300 and/or housing 200 are moveable and biasing mechanism 500 may move the snapping plate 300 and/or housing 200 toward the snapped position. In the snapped position, the front portion 310 of the snapper plate 300 closes the opening of the housing 200, confining a rodent inside the housing 200. The biasing mechanism 500 should provide sufficient action such that the snapping plate 300 and/or housing 200 move to the snapped position almost simultaneously with the actuation of the triggering mechanism 400 and the release of the latching mechanism 600. In addition the biasing mechanism should provide sufficient force so that when the snapper plate 300 and/or housing 200 are in the snapped position, a rodent trapped inside cannot manipulate the housing 200 or the snapper plate 300 and open them. As described above, it will be appreciated that there are various suitable biasing mechanisms 500 that may be incorporated into the trap 100 to provide the features described herein.

Figure 6:
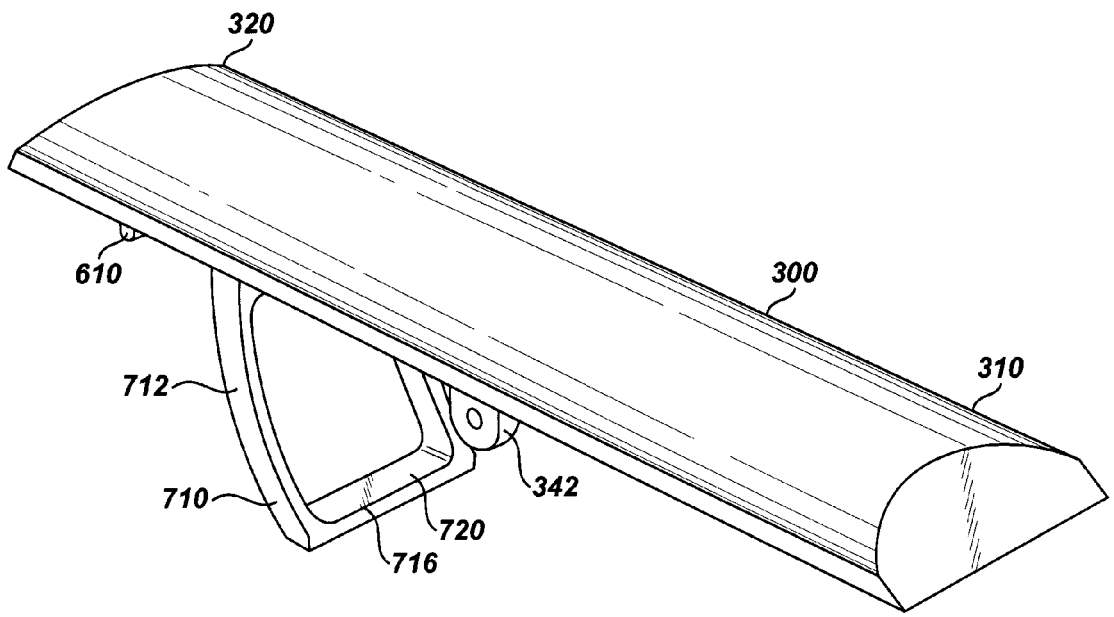
FIG. 6 depicts a perspective view of a snapper plate, in accordance with an exemplary embodiment.

In exemplary embodiments, when the snapper plate 300 and/or housing 200 are in the snapped position a snare 700 further entraps a rodent inside the trap. For example, as shown in FIG. 6, snapper plate 300 has a snare loop 710 that extends from the rear portion 320 of the snapper plate 300. When the snapper plate 300 is in the open position, the snare loop 710, extends through the hole into the rear portion 220 of the housing 200, generally encircling the housing 200, as shown in FIGS. 2-3. When the snapper plate 300 is in the snapped position, the rear portion 320 of the snapper plate 300 is raised, the snare loop 710 is lifted toward the upper wall of the housing 200, as shown in FIG. 3. The snare loop 710, and triggering mechanism 400 may be configured so that when a rodent actuates the triggering mechanism, the snare loop 710 encircles at least a portion of the rodent. For example, as shown in FIG. 2, the snare loop 710 is located just forward of the trigger plate 410, so that when a rodent depresses the trigger plate 410 with its front paw, the snare loop 710 encircles the portion of the rodent behind its front paws. It will be appreciated that snare loop 710 may be positioned in various positions within the housing 200, such that it is calculated to encircle at least a portion of the rodent when the rodent actuates the triggering mechanism 400. For example, the snare loop 710 could be disposed forward in the housing 200, so that it is configured to encircle a lower portion of the torso of the rodent in the snapped position. Alternatively, the snare loop 710 may be disposed more rearward in housing 200, so that it is configured to encircle the neck or head of the rodent in the snapped position.

In the exemplary embodiments, when the snare loop 710 is lifted by snapper plate 300, it carries with it at least a portion of the rodent that actuates the triggering mechanism 400. Preferably, when the housing 200 and snapper plate 300 is in its fully snapped position, the snare loop 710 constricts the rodent against the upper wall, as shown in FIG. 4. As discussed above, the biasing mechanism 500 is configured so that the rodent is snared in the snare loop 710 about simultaneously with the release of the latching mechanism 600. Furthermore, the biasing mechanism 500 provides sufficient force to hold the snared rodent so that it cannot free itself from the snare.

In the exemplary embodiment illustrated in FIG. 6, snare loop 710 is a semi-rigid member, downwardly depending from snapper plate 300. The snare loop 710 is at least partially defined by two downward projecting sides, such as sides 712 and 714 illustrated in FIG. 6, and a base member 716 joining sides 712 and 714. The snare loop 710 may have any suitable shape, so long as it is sufficient to encircle the housing 200 when it is in a set position, and sufficient to constrict a rodent when it is in a raised position. The snare loop 710 may be rigid, semi-rigid, flexible, or combinations thereof. The snare loop 710 should have at least sufficient strength to hold a rodent, and constrict it when the snare loop 710 is in a lifted or raised position. In the exemplary embodiments, the snare loop 710 further has an inward facing surface 720, that faces the ensnared rodent. In certain exemplary embodiments, the inward facing surface 720 may have various surface features, such as grooves, or rides, or teeth-like projections, that assist the snare 710 in holding the ensnared rodent within the snare 710.

In various exemplary embodiments, the trap 100 disclosed herein is configured for a single use. Accordingly, it is preferred that the trap 100 and its members are made of a relatively inexpensive material, such as a thin-walled rigid polymeric material that may be injection molded in to the desired shapes. For example, the first and second housing members preferably are made of a polymeric material, such as rigid styrene polymers and co-polymers. Other suitable materials include acrylonitrile-butadiene-styrene (ABS), or polyvinylchloride (PVC). It is appreciated that other suitable polymeric materials may be selected for the construction of the trap 100 or its component parts.

In certain exemplary embodiments, each of the component parts described herein are injection molded to a desired shape. In some exemplary embodiments, each component part may be molded as a single, unitary molded part. In other exemplary embodiments, the component part may be molded in multiple parts that are joined or attached together to form the component part. The various means for designing molds, and joining various parts to form one component part will be understood by one familiar with such processes and parts.

In the preceding specification, various preferred exemplary embodiments have been described with reference to the accompanying drawings. It will, however, be evident that various modifications and changes may be made thereto, and additional exemplary embodiments may be implemented, without departing from the broader scope of the invention as set forth in the claims that follow. The specification and drawings are accordingly to be regarded in an illustrative rather than restrictive sense.

What is claimed is:

1. A rodent trap comprising:
a housing having a top and at least one opening therein providing a passageway into the housing;
a snapper plate assembly comprising:
a plate pivotally coupled with the top of the housing and having a snare portion and a door portion, wherein the plate pivots between a latched position and a triggered position;
a rigid or semi-rigid snare loop integrally coupled with the snare portion of said plate, and extending at least partially into said housing, wherein the snare loop pivots between a first portion, which enables a rodent to position itself at least partially within the snare loop, and a second position that traps at least a portion of the rodent in the snare loop; and
a trigger that, when triggered by a rodent, causes the plate to pivot to the triggered position, whereby the snare loop pivots toward the second position constricting the rodent between a portion of the snare loop and the top of the housing, and the door portion of the plate substantially obstructs the opening.

2. The rodent trap of claim 1, further comprising a biasing mechanism that biases the snare loop toward said second position.

3. The rodent trap of claim 2, wherein the biasing mechanism comprises at least one v-shaped spring clip that is operably coupled with said snare loop and said housing.

4. The rodent trap of claim 1, further comprising a latch that, when latched, holds said snare loop in said first position; wherein said trigger, when triggered, releases the latch from its latched position.

5. The rodent trap of claim 1, further comprising an attractant disposed inside of said housing.

6. The rodent trap of claim 5, wherein said attractant is selected from the group consisting of a food bait, a chemical bait, a fragrance, a rodenticide, and any mixture or combination thereof.

7. The rodent trap of claim 5, further comprising an attractant opening in said housing for inserting or removing said attractant.

8. The rodent trap of claim 4, wherein said trigger comprises a trigger plate pivotally coupled with said housing.

9. The rodent trap of claim 8, wherein said housing comprises a base surface, and said trigger plate is elevated from said base surface.

10. The rodent trap of claim 1, comprising a rigid polymeric material.

11. A rodent trap comprising:
a housing comprising a base, a top, and at least one opening providing a passageway into the housing;
a snapper plate assembly comprising:
a plate having a snare portion and a door portion, whereby the plate is pivotally coupled with the top of said housing along a pivot axis; and
a rigid or semi-rigid snare loop integrally attached to the snare portion of the snapper plate, extending at least partially into said housing;
a trigger disposed at least partially inside said housing that, when triggered by a rodent, causes the snapper plate assembly to pivot, thereby causing the snare loop to constrict the rodent between a portion of the snare loop and the top of the housing, and causing the door portion to substantially obstruct the opening.

12. The rodent trap of claim 11, wherein said trigger causes the snapper plate assembly to pivot from a first position to a second position;
wherein said first position enables a rodent to enter the housing through the opening and position itself at least partially within the snare loop; and
wherein said second position obstructs the opening with said plate and snares at least a portion of the rodent with said snare loop, trapping the rodent against the housing.

13. The rodent trap of claim 12, further comprising:
a biasing mechanism biasing the snapper plate assembly toward said second position.

14. The rodent trap of claim 13, wherein the biasing mechanism comprises at least one v-shaped spring clip that is operably coupled with said snapper plate assembly and said housing.

15. The rodent trap of claim 13, further comprising a latch that, when latched, holds said snapper plate assembly in said first position; and wherein said trigger, when triggered, releases the latch from its latched position.

16. The rodent trap of claim 11, further comprising an attractant disposed inside of said housing.

17. The rodent trap of claim 16, wherein said attractant is selected from the group consisting of a food bait, a chemical bait, a fragrance, a rodenticide, and any mixture or combination thereof.

18. The rodent trap of claim 17, further comprising an attractant opening in said housing for inserting or removing said attractant.

19. The rodent trap of claim 15, wherein said trigger comprises a trigger plate pivotally coupled with said housing.

20. The rodent trap of claim 19, wherein said trigger plate is elevated from said base of said housing.

21. The rodent trap of claim 11, comprising a rigid polymeric material.

* * * * *